United States Patent
Cassidy (10) Patent No.: US 10,787,068 B2
(45) Date of Patent: Sep. 29, 2020

(54) RETRACTABLE CAR COVER

(71) Applicant: Michael A. Cassidy, Bainbridge Island, WA (US)

(72) Inventor: Michael A. Cassidy, Bainbridge Island, WA (US)

(*) Notice: Subject to any disclaimer, the term of this patent is extended or adjusted under 35 U.S.C. 154(b) by 162 days.

(21) Appl. No.: 15/664,826

(22) Filed: Jul. 31, 2017

(65) Prior Publication Data
US 2019/0031008 A1 Jan. 31, 2019

(51) Int. Cl.
*B60J 11/02* (2006.01)
*B60J 11/04* (2006.01)

(52) U.S. Cl.
CPC .............. *B60J 11/025* (2013.01); *B60J 11/04* (2013.01)

(58) Field of Classification Search
CPC .................................. B60J 11/025; B60J 11/04
See application file for complete search history.

(56) References Cited

U.S. PATENT DOCUMENTS

| | | | | |
|---|---|---|---|---|
| 2,312,629 A | * | 3/1943 | Culver | A63H 33/20 446/51 |
| 2,363,732 A | * | 11/1944 | Jenkins | B64D 17/80 244/113 |
| 3,310,018 A | * | 3/1967 | Roberts, Jr. | B63H 9/1071 114/104 |
| 4,519,644 A | | 5/1985 | Song | |
| 4,720,135 A | | 1/1988 | Farina | |
| 4,764,998 A | | 8/1988 | Norris et al. | |
| 4,834,446 A | * | 5/1989 | Tung-Chow | B60J 11/02 135/88.05 |
| 4,856,842 A | | 8/1989 | Ross et al. | |
| 5,025,746 A | * | 6/1991 | Boulter | B63B 21/48 114/311 |

(Continued)

FOREIGN PATENT DOCUMENTS

CN 205523620 U 8/2016
DE 3245017 A1 6/1984

(Continued)

OTHER PUBLICATIONS

AirSource Military, https://www.youtube.com/watch?v=SX3n2baYjys, print out at 1:10 (Year: 2015).*

(Continued)

*Primary Examiner* — Tri M Mai
(74) *Attorney, Agent, or Firm* — Lowe Graham Jones PLLC (57) ABSTRACT

Embodiments are directed to a vehicle cover system. The vehicle cover system may include a vehicle cover, a container, and one or more gathering cords. The container may have one or more cord channels that each have a first side that faces the interior of the container and a second side that faces the exterior of the container. The one or more gathering cords may extend through the one or more cord channels from the first side to the second side. Each of the one or more gathering cords may be mechanically coupled to the vehicle cover on the first side of the one or more cord channels and may be accessible on the second side of the one or more cord channels in the environment external the container while the vehicle cover covers the vehicle and while the vehicle cover is housed in the container.

19 Claims, 5 Drawing Sheets

(56) References Cited

U.S. PATENT DOCUMENTS

| | | | | |
|---|---|---|---|---|
| 5,078,330 | A * | 1/1992 | Hall | B60J 11/02 |
| | | | | 150/166 |
| 5,086,988 | A * | 2/1992 | LaPoint | B65H 75/406 |
| | | | | 242/395 |
| 5,176,421 | A | 1/1993 | Fasiska | |
| 5,472,257 | A * | 12/1995 | Kaya | B60J 11/02 |
| | | | | 150/166 |
| 6,981,509 | B2 * | 1/2006 | Sharapov | B60J 11/02 |
| | | | | 114/361 |
| 2006/0232095 | A1 | 10/2006 | Sedighzadeh | |
| 2013/0233498 | A1 * | 9/2013 | Kaya | B60J 11/02 |
| | | | | 160/127 |

FOREIGN PATENT DOCUMENTS

| | | |
|---|---|---|
| EP | 2958766 A1 | 12/2015 |
| WO | 9631358 A1 | 10/1996 |
| WO | 2011004105 A1 | 11/2011 |
| WO | 2014008560 A1 | 1/2014 |

OTHER PUBLICATIONS

Anti-theft Automatic Car cover box (white). (Mar. 21, 2015). Retrieved Jul. 24, 2017, from https://uae.souq.com/ae-en/anti-theft-automatic-car-cover-box-white-7851779/i/. 2 pages.

2017 hot sale electric heated car cover car sun shade automatic roller car cover . (May 29, 2016). Retrieved May 2, 2017, from https://www.alibaba.com/product-detail/2017-hot-sale-electric-heated-car_60656879248.html?s=p. 16 pages.

* cited by examiner

RETRACTABLE CAR COVER

FIELD OF THE INVENTION

The present invention relates generally to vehicle covers and, more particularly, yet not exclusively, to retractable vehicle covers.

BACKGROUND OF THE INVENTION

Vehicle covers can protect vehicles from elements in the surrounding environments, such as dust, harmful light, bird droppings, precipitation, or the like. Storage of vehicle covers, however, can be a chore. For example, vehicle covers can typically be compressed into relatively small spaces yet often expand when released. To address the problem of storing vehicle covers, vehicle covers are often sold with storage sacks into which users can stuff the vehicle covers for storage, much like sleeping bags. Stuffing vehicle covers into storage sacks can be time consuming and labor intensive.

Attempts to address the above-described problems have included containers that retract vehicle covers. These containers typically include a retraction mechanism in the container that rotates to wrap the cover around the retraction mechanism in the container. Not only are these retracting containers often cost prohibitive, these retracting containers can also be prone to failure. Thus, it is with regard to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of the Various Embodiments, which is to be read in association with the accompanying drawings, wherein.

DETAILED DESCRIPTION OF THE VARIOUS EMBODIMENTS

The various embodiments now will be described more fully hereinafter with reference to the accompanying drawings, which form a part hereof and show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete and will fully convey the scope of the embodiments to those skilled in the art. Among other things, the various embodiments may be methods, systems, or devices. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." Also, throughout the specification and the claims, the use of "when" and "responsive to" do not imply that associated resultant actions are required to occur immediately or within a particular time period. Instead, they are used herein to indicate actions that may occur or be performed in response to one or more conditions being met, unless the context clearly dictates otherwise. Additionally, throughout the specification, the use of "exemplary" does not imply that other embodiments do not perform as well or are not as worthy of illustration. Instead, the term is used herein to emphasize that each element or function described by the term is an example element or function.

Figure 1A:
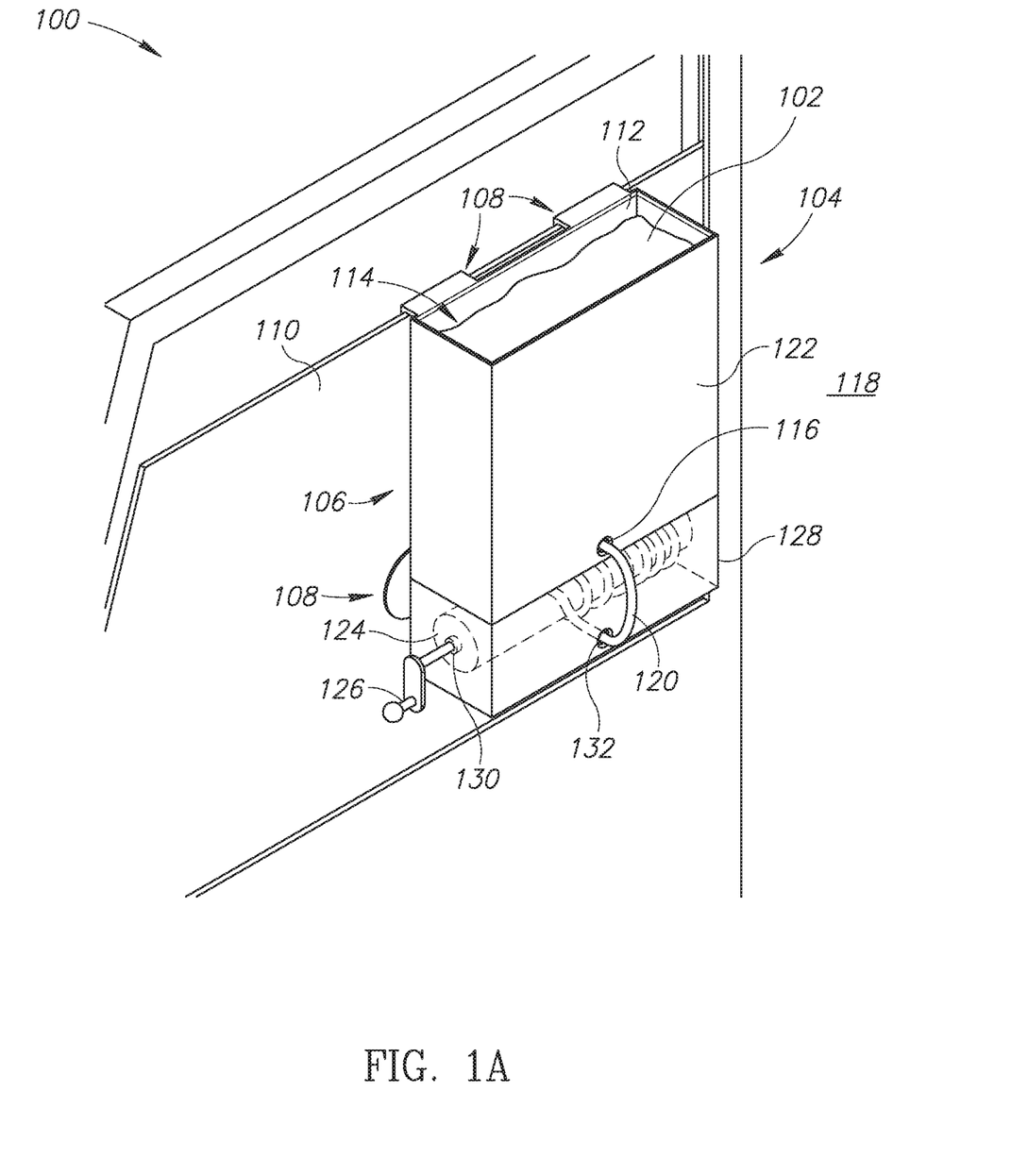
FIG. 1A illustrates a schematic representation of an example vehicle cover system, including a vehicle cover in a retracted configuration.

FIG. 1A illustrates a schematic representation of example vehicle cover system 100 in a retracted configuration. Vehicle cover system 100 includes vehicle cover 102 and container 104 that houses vehicle cover 102. Vehicle cover 102 may be deployed from and retracted back into container 104.

Container 104 includes container body 106. Container 104 includes one or more anchors or mounts 108 coupled or integral to container body 106 to facilitate coupling container 104 to one or more portions of vehicles, such as vehicle windows 110, doors, fenders, trunks, hoods, wheels, or the like. Anchors 108 may include one or more hooks, suction cups, clamps, hook-and-loop fasteners (such as those made by Velcro®), magnets, strings, or the like. For example, anchors 108 coupled to the top of rear wall 112 of container body 106 may include one or more hooks, while anchors coupled to the bottom or the middle of rear wall 112 may include one or more suction cups to facilitate maintenance of the position and orientation of container 104 relative to window 110 during deployment or retraction of vehicle cover 102.

Container body 106 can have any suitable shape, such as box-shaped, ovoid-shaped, inverted-pyramid-shaped, or the like, to facilitate housing, deploying, and retracting vehicle cover 102. Container body 106 can have any suitable dimensions to facilitate housing, deploying, and retracting vehicle cover 102. In some example implementations, container body 106 has i) a depth of 6, 12, 18, 24, or more inches, ii) a width of 7.5, 15, 22.5, 30, or more inches, and iii) a height of 7.5, 15, 22.5, 30, or more inches. One or more faces of container body 106, such as the top of container body 106, may be permanently open or may have a lid, such as a removable lid or a hinged lid, that facilitates access to interior space 114 of container body 106. One or more walls of container body 106 may include one or more rigid or semi-rigid portions to facilitate at least partial maintenance of the shape of container body 106 when deploying or retracting vehicle cover 102. For example, rear wall 112 may be made of firm, lightweight material (for example, carbon fiber, expanded polyvinyl chloride (PVC), polypropylene, another plastics material, or the like) or may include one or more rigid or semi-rigid slats, such as one or more vertical, horizontal, or diagonal slats (for example, one or more slats positioned and oriented to form a rigid or semi-rigid frame).

One or more walls of container body 106 includes one or more cord channels or tubular passages 116 that couple interior space 114 of container body 106 to environment 118 external to container 104. Each cord channel 116 may be defined by or lined with a material (for example, nylon, polytetrafluoroethylene (PTFE), aluminum, stainless steel, or the like) that provides a low coefficient of friction with one or more gathering cords 120, such as a grommet or tube. Each cord channel 116 fluidly couples the interior space 114 of container body 106 to environment 118. One or more gathering cords 120 extend through each cord channel 116, thereby providing human hand access to one or more portions of one or more gathering cords 120 from environment 118 external to container 104 without opening or removing portions of container 104 to facilitate relatively easy manual retraction of vehicle cover 102. For example, front wall 122 of container body 106 may be disposed opposite interior space 114 of container body 106 from rear wall 112 and may include cord channel 116 through which one or more gathering cords 120 extend from interior space 114 of container body 106 to environment 118 external to container 104.

Container 104 may include cord reel 124 to facilitate storage of one or more gathering cords 120 or retraction of vehicle cover 102. Cord reel 124 may include one or more motors, crank handles 126, or the like that rotate cord reel 124 to facilitate retraction of vehicle cover 102.

Container 104 may include reel compartment 128 that houses cord reel 124 to facilitate protection of cord reel 124 from elements of environment 118 external to container 104. Reel compartment 128 may be separable from or integral to container body 106. Reel compartment 128 may have one or more handle channels or tubular passages 130 through which one or more crank handles 126 extend. Reel compartment 128 may also have one or more cord channels or tubular passages 132 through which one or more gathering cords 120 extend from the interior space of reel compartment 128 to environment 118 external to container 104, thereby providing access to one or more portions of one or more gathering cords 120 in environment 118 external to container 104 without opening or removing portions of container 104 to facilitate relatively easy manual retraction of vehicle cover 102 in event that cord reel 124 fails. Each cord channel 132 may be defined by or lined with a material (for example, nylon, polytetrafluoroethylene (PTFE), aluminum, stainless steel, or the like) that provides a low coefficient of friction with one or more gathering cords 120, such as a grommet or tube.

Figure 1B:
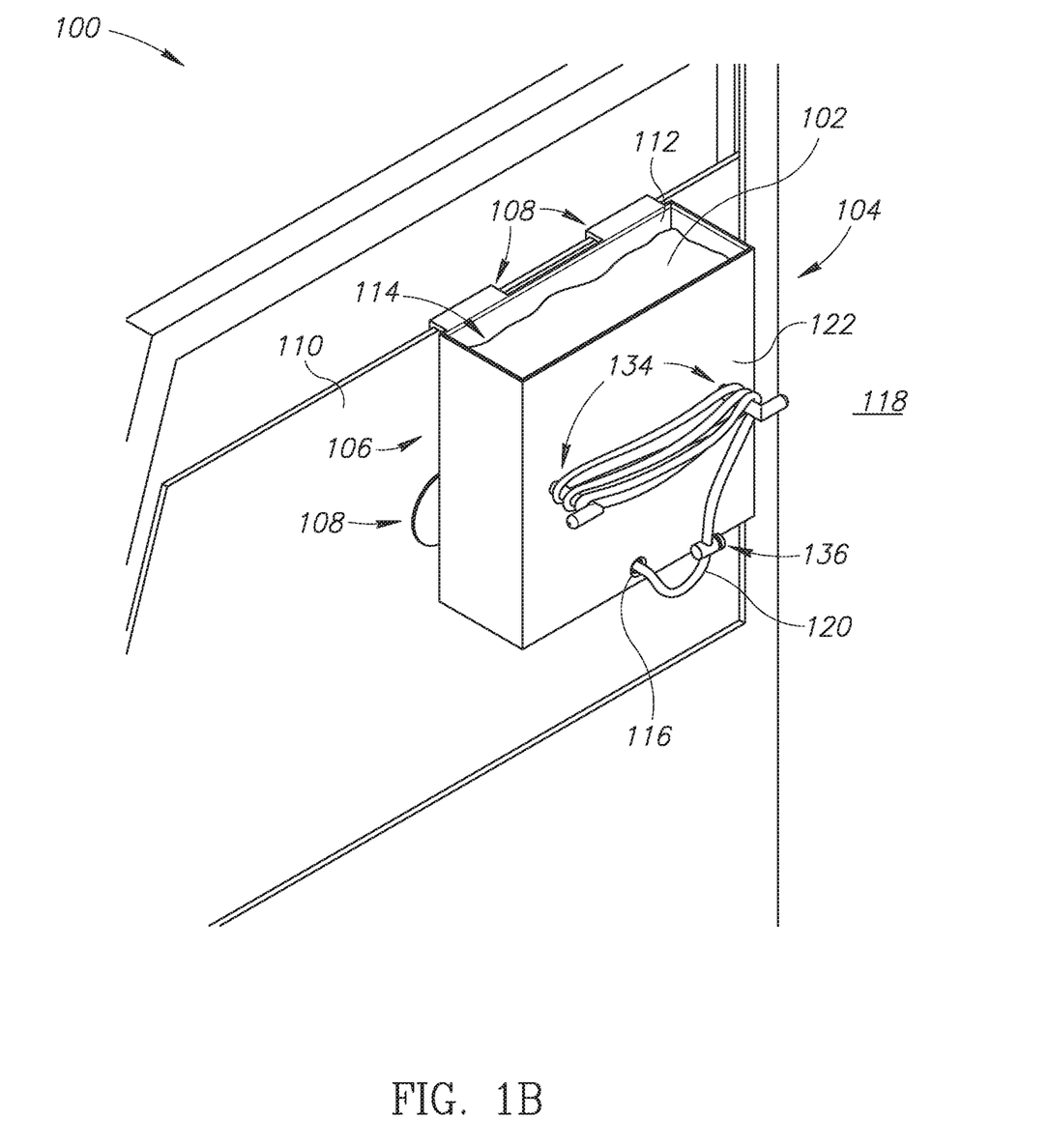
FIG. 1B shows a schematic representation of the vehicle cover system of FIG. 1A, including cord holders and a cord lock.

FIG. 1B shows a schematic representation of another example implementation of vehicle cover system 100. Vehicle cover system 100 may include one or more cord holders 134 coupled to one or more exterior faces of one or more walls of container body 106, such as the exterior face of front wall 122. Examples of cord holders 134 include one or more hooks, racks, rails, pegs, clamps, hook-and-loop fasteners (such as those made by Velcro®), strings, or the like. One or more portions of each gathering cord 120 may be removed from one or more cord holders 134 to facilitate deployment of vehicle cover. Conversely, the one or more portions of each gathering cord 120 may be wrapped around or otherwise secured via one or more cord holders 134 after or during retraction of vehicle cover 102 to facilitate storage of each gathering cord 120.

Vehicle cover system 100 may also include one or more cord locks 136. One or more cord locks may be disposed on one or more gathering cords 120 to facilitate prevention of expansion of vehicle cover 102 from interior space 114 of container body 106. Each cord lock 136 has one or more cord ports through which one or more cords, such as one or more gathering cords 120, extend to facilitate maintenance of tension on vehicle cover 102 by each cord that extends through each cord lock 136. Each cord lock 136 can be manipulated to transition from a locked configuration to an unlocked configuration to facilitate movement of each cord lock 136 relative to each gathering cord 120 that extends through each cord lock 136. Each cord lock 136 may be spring loaded to facilitate bias of each cord lock 136 toward the locked configuration. For example, prior to or during deployment of vehicle cover 102, a user may transition one or more cord locks 136 to the unlocked configuration and slide each cord lock 136 along each gathering cord 120 toward one or more gathering cord end portions that are at the opposite end from vehicle cover 102 to facilitate relatively easy passage of each gathering cord 120 through each cord channel 116 in container body 106. As another example, subsequent to or during retraction of vehicle cover 102, the user may transition one or more cord locks 136 to the unlocked configuration, slide each cord lock 136 along each gathering cord 120 toward the one or more gathering cord end portions that are coupled to vehicle cover 102, and transition one or more cord locks 136 to the locked configuration to facilitate maintenance of tension on vehicle cover 102 by each gathering cord 120.

Figure 2:
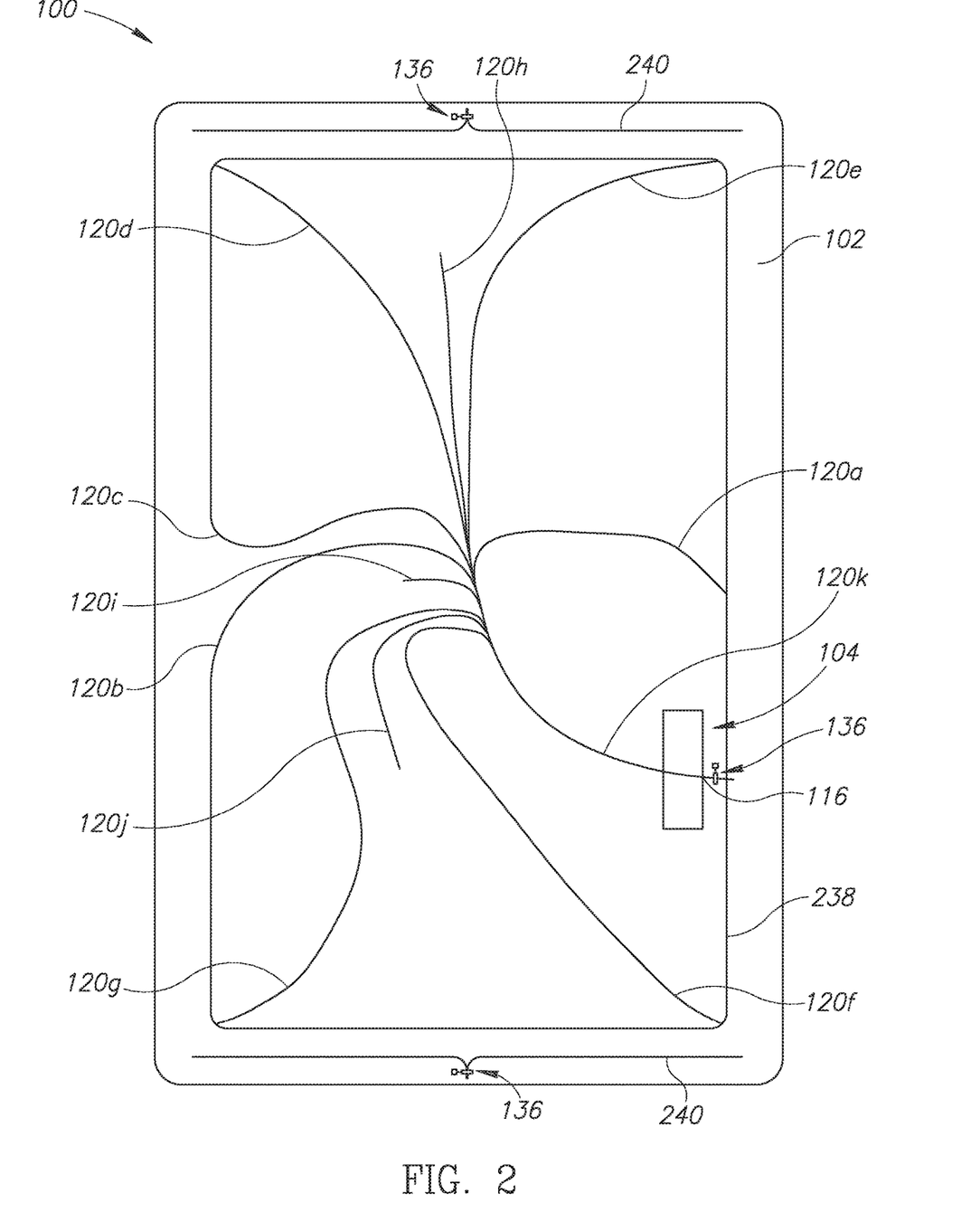
FIG. 2 illustrates a schematic representation of the vehicle cover system of FIG. 1A, with the vehicle cover in a deployed configuration.

FIG. 2 illustrates a schematic representation of vehicle cover system 100 in a deployed configuration. Vehicle cover 102 may include one or more layers that include one or more materials (for example, polyurethane, polyester-polyurethane, cotton, silk, polypropylene, polyethylene, or the like) that are sufficient to protect components of a vehicle from various elements in environment 118, such as dust, pollen, harmful light, tree branches, moisture, or the like. Vehicle cover 102 may be form-fitted to a particular vehicle type or model or may be a stretch cover that takes the basic shape of an underlying vehicle.

One or more gathering cords 120 extend through each cord channel 116 in container 104 to one or more portions of vehicle cover 102. One or more portions of one or more gathering cords 120 may include one or more materials (for example, nylon, rubber, or the like) that are flexible and that have sufficiently high tensile strength to withstand a pulling force that retracts vehicle cover 102 into interior space 114 of container body 106.

In some example implementations, perimeter cord 238 extends partially or entirely around the perimeter portion of vehicle cover 102 to facilitate securing (and removing) vehicle cover 102 around the perimeter of a vehicle. One or more portions of perimeter cord 238 may include the same material as one or more gathering cords 120. In some example implementations, one or more portions of perimeter cord 238 includes one or more materials (for example, rubber or the like) that have sufficiently high elasticity to at least partially pull the perimeter portion of vehicle cover 102 toward the vehicle body when pulled over one or more protruding portions of the vehicle, such as fenders or the like. Perimeter cord 238 may be disposed in one or more perimeter channels (for example, a channel defined by tubular fabric, eye loops, hooks, or the like sewn into vehicle cover 102) disposed in the perimeter portion of vehicle cover 102.

One or more gathering cords 120 may couple to perimeter cord 238. For example, one or more gathering cords 120 (for example, gathering cord 120a) may couple to perimeter cord 238 via one or more T-branch connections (for example, one or more crimped connections, wrapped or tied connections, crimp clips, eye loops, hooks, or the like). Also for example, one or more gathering cords 120 (for example, one or more of gathering cords 120b or 120c) may be part of perimeter cord 238 or couple to one or more ends of perimeter cord 238 (for example, one or more crimped connections, wrapped or tied connections, crimp clips, eye loops, hooks, or the like) to facilitate contracting the perimeter portion of vehicle cover 102 when pulled toward cord channel 116 in container 104.

One or more gathering cords 120 (for example, gathering cords 120d, 120e, 120f, or 120g) may couple to corner portions of vehicle cover 102 (for example, sewn directly to vehicle cover 102 or coupled to one or more connectors sewn to vehicle cover 102, or the like) or perimeter cord 238 (for example, one or more crimped connections, wrapped or tied connections, crimp clips, eye loops, hooks, or the like) to facilitate retracting the corner portions of vehicle cover 102 when pulled toward cord channel 116 in container 104. One or more gathering cords 120 (for example, gathering cords 120h, 120i, or 120j) may couple to middle portions of vehicle cover 102 (for example, sewn directly to vehicle cover 102 or coupled to one or more connectors sewn to vehicle cover 102, or the like) to facilitate retracting the middle portions of vehicle cover 102 when pulled toward cord channel 116 in container 104.

One or more branch gathering cords 120 (for example, one or more of gathering cords 120a-120j) may be part of or coupled to (for example, one or more crimped connections, wrapped or tied connections, crimp clips, eye loops, hooks, or the like) the same one or more root gathering cords 120 (for example, gathering cord 120k) to facilitate retraction of multiple portions of vehicle cover 102 for each root gathering cord 120 pulled through cord channel 116 in container 104. One or more gathering cords 120 may have different lengths than one or more other gathering cords 120 to facilitate retraction of vehicle cover 102 in a predefined manner when pulled toward cord channel 116 in container 104. In some example implementations of vehicle cover system 100, one or more gathering cords 120 have lengths that are predetermined to facilitate uniform or nonuniform retraction of the selected portions of vehicle cover 102. For example, one or more gathering cords 120 may have lengths that are predetermined to facilitate retraction of selected portions of vehicle cover 102 into container 104 in a predefined order (for example, an order that may, at least in comparison to a different order of retraction, reduce space consumption by vehicle cover 102 in the retracted configuration, improve ease of subsequent deployment, reduce stress or wear-and-tear in vehicle cover 102, or the like). In other examples, where multiple gathering cords 120 extend through one or more cord channels 116, one or more gathering cords 116 may be pulled in a predetermined order to retract different portions of vehicle cover 102 into interior 114 of container 104 at different times.

In some example implementations, when vehicle cover 102 is in the deployed configuration, one or more gathering cords 120 are disposed below vehicle cover 102 (for example, between vehicle cover 102 and a vehicle that vehicle cover 102 covers), above vehicle cover 102 (for example, opposite vehicle cover 102 from a vehicle that vehicle cover 102 covers), or in vehicle cover 102 (for example, between layers of vehicle cover 102, in one or more sleeves that are integral or coupled to vehicle cover 102 and that define one or more channels for one or more gathering cords 120, or the like). Disposing one or more gathering cords 120 below vehicle cover 102 may facilitate reduction of evidence of the presence of vehicle cover system 100, thereby reducing attraction to potential thieves. Disposing one or more gathering cords 120 above vehicle cover 102 may facilitate prevention of tangling with or damage to vehicle components by gathering cords 120. In some example implementations where one or more gathering cords 120 are disposed above vehicle cover 102 in the deployed configuration, vehicle cover 102 has a passage disposed near container 104 to facilitate extension of one or more gathering cords 120 from container 104 below vehicle cover 102 through vehicle cover 102 to the upper side of vehicle cover 102. Disposing one or more gathering cords 120 in vehicle cover 102 may facilitate shielding a vehicle from gathering cords 120 and may also facilitate shielding gathering cords 120 from the view of potential thieves.

One or more drawstring cords 240 may be disposed one or more positions in vehicle cover 102, such as opposite end portions of vehicle cover 102 that correspond to the front and rear ends of a vehicle, to facilitate securing vehicle cover 102 to the vehicle. Each drawstring cord 240 may include the same material as one or more gathering cords 120. One or more drawstring cords 240 may have one or more ends coupled to one or more corner portions of vehicle cover 102 (for example, sewn directly to vehicle cover 102 or coupled to one or more connectors sewn to vehicle cover 102, or the like). In the example shown in FIG. 2, each drawstring cord 240 has two end portions coupled to opposite corner portions of vehicle cover 102 at one end portion of vehicle cover 102. Also in the example shown in FIG. 2, a middle portion of each drawstring cord 240 extends through cord lock 136 to facilitate adjustment of the effective length of each drawstring cord 240.

Vehicle cover 102 in the deployed configuration may have any other suitable shape to cover a vehicle, such as an automobile, golf cart, motorcycle, personal watercraft, snowmobile, airplane, tractor, boat, or the like. For example, vehicle cover 102 may have i) a longitudinal length that is at least as long as the longitudinal length of a vehicle that vehicle cover 102 covers, ii) a width as measured perpendicular to the longitudinal length that is at least as wide as the width of the vehicle, iii) a height that, for example, is at least as tall as the height of the body of the vehicle minus the amount that the bottom of the body is lifted off the ground by wheels or other structure that extend below the body, iv) various extension portions that correspond to portions of the vehicle that extend out from the body of the vehicle (for example, mirrors, handlebars, wings, or the like), v) various contours that correspond to contours in the outer surface of the vehicle body, or the like. As shown in FIG. 2, vehicle cover 102 in the deployed configuration has a shape that is suitable to cover a passenger car.

Figure 3:
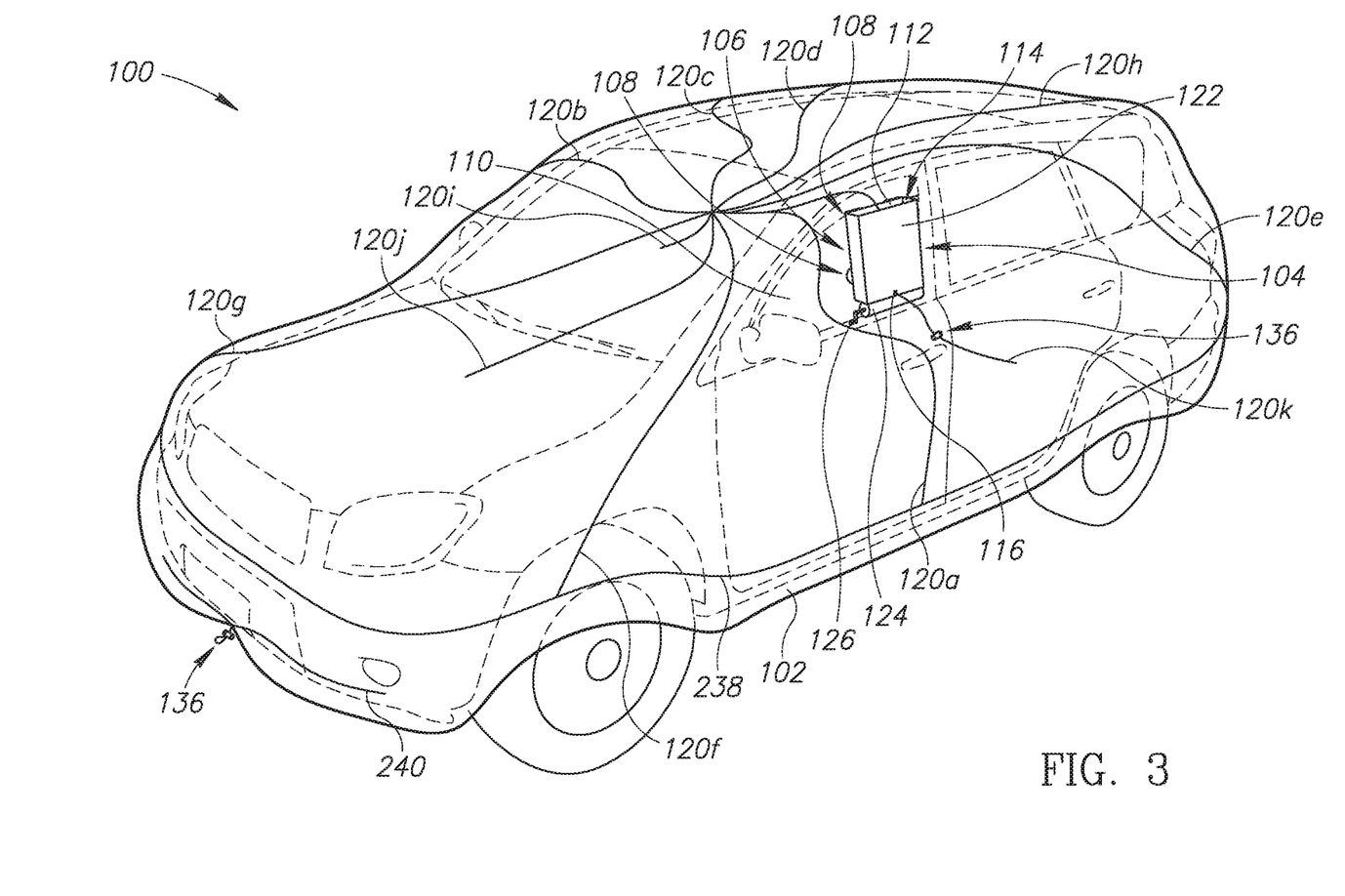
FIG. 3 shows a schematic representation of the vehicle cover system of FIG. 1A, with the vehicle cover in the deployed configuration.

FIG. 3 shows a schematic representation of vehicle cover system 100 in the deployed configuration over a vehicle, with vehicle cover 102 shown as transparent to aid in explanation. Anchors 108 couple and secure container 104 to the vehicle. Drawstring cords 240 are disposed below one or more portions of the vehicle fenders that protrude from the vehicle body to facilitate securement of vehicle cover 102 to the vehicle.

Figure 4:
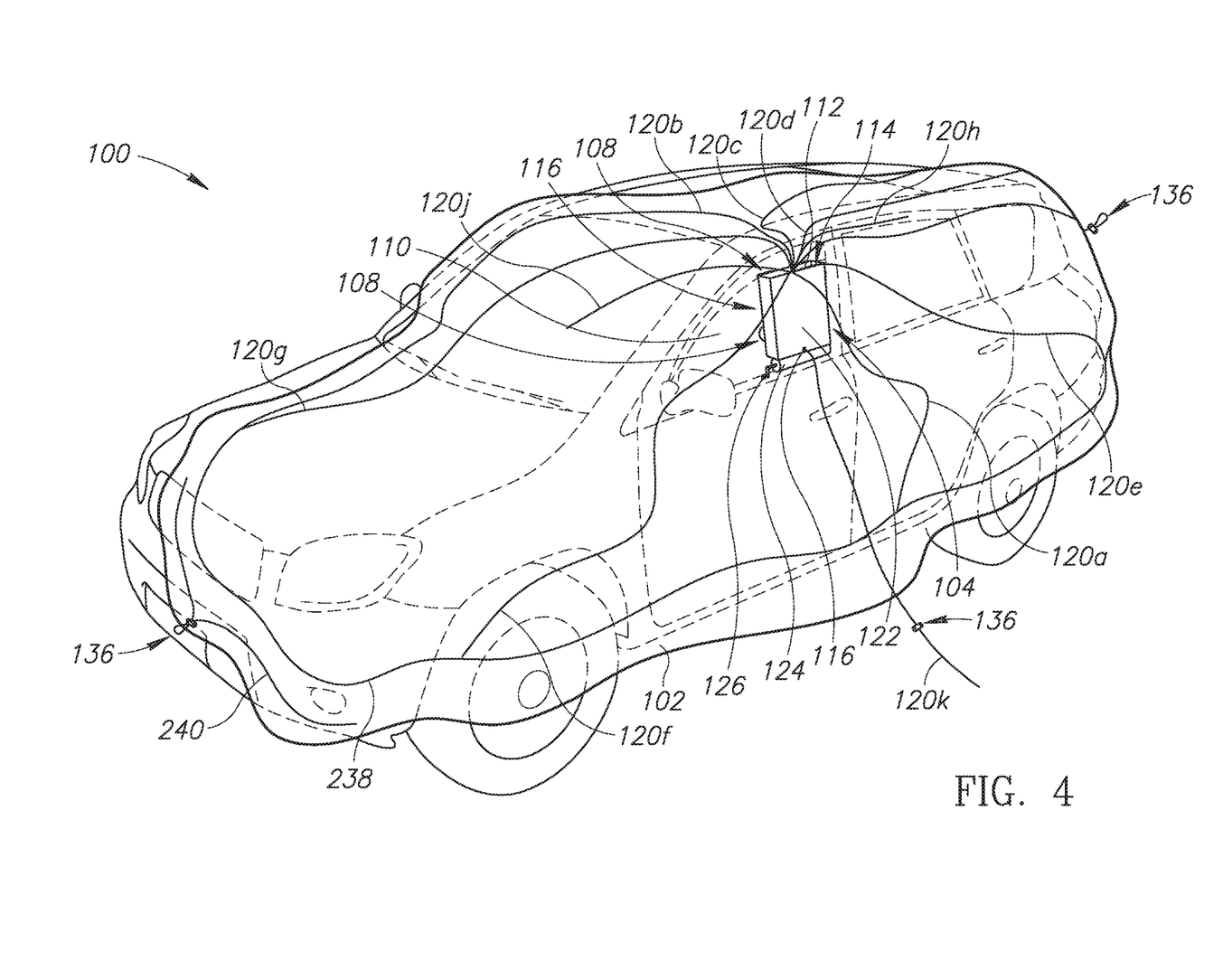
FIG. 4 illustrates a schematic representation of the vehicle cover system of FIG. 1A, with the vehicle cover transitioning between the deployed configuration and the retracted configuration.

FIG. 4 illustrates a schematic representation of vehicle cover system 100 while vehicle cover system 100 transitions between the deployed configuration and the retracted position. Contrasting FIG. 4 with FIG. 3 logically shows one example relationship, although not necessarily to scale, between i) the amount of gathering cord 120k that extends from interior space 114 of container body 106 through cord channel 116 into environment 118 external to container 104 and ii) the amount of deployment or retraction of various portions of vehicle cover 102. For example, as vehicle cover 102 is deployed from container 104 (for example, transitioning from FIG. 1A or 1B to FIG. 4 to FIG. 3), there is a decrease in the amount of gathering cord 120k that extends from interior space 114 of container body through cord channel 116 into environment 118 external to container 104. Conversely, in this example, as the gathering cord 120k is pulled from interior space 114 of container body 106 through cord channel 116 into environment 118 external to container 104 (for example, transitioning from FIG. 3 to FIG. 4 to FIG. 1A or 1B), various portions of vehicle cover 102 that are coupled to perimeter cord 238 or gathering cords 120a-120j are pulled toward or into interior space 114 of container body 106.

The foregoing examples should not be construed as limiting or exhaustive, yet rather, illustrative use cases to show implementations of at least one of the various embodiments of the invention. Accordingly, many changes can be made without departing from the spirit and scope of the invention. For example, changes to the example implementation illustrated in FIG. 1A may include one or more of omission of reel compartment 128 while retaining reel 124, inclusion of one or more cord holders 134, inclusion of one or more cord locks 136, inclusion of an openable cover over the portion of one or more gathering cords that is opposite cord channel 116 from interior space 114 of container body 106, or the like. Thus, the scope of the invention is not limited by the disclosure of the examples. Instead, the invention should be determined entirely by reference to the claims that follow.

The embodiments of the invention in which an exclusive property or privilege is claimed are defined as follows:

1. A vehicle cover system, comprising:
a vehicle cover, the vehicle cover being sized and dimensioned to entirely or partially cover a vehicle that is configured to transport a human and that has a body having a longitudinal length, a width measured transverse to the longitudinal length of the vehicle body, and a height measured transverse to the longitudinal length of the vehicle body and the width of the vehicle body, the vehicle cover having a longitudinal length, a width measured transverse to the longitudinal length of the vehicle cover, and a height measured transverse to the longitudinal length of the vehicle cover and the width of the vehicle cover, the longitudinal length of the vehicle cover being at least as large as the longitudinal length of the vehicle body, the width of the vehicle cover being at least as large as the width of the vehicle body, and the height of the vehicle cover being at least as large as the height of the vehicle body;
a container having an interior and an exterior, the container being sized and dimensioned to house the vehicle cover in the interior of the container, the container having one or more coupling means for coupling the container to a retractable window disposed in a window frame of the vehicle during deployment of the vehicle cover from the container, an opening to removably receive the cover into the interior of the container while the container is coupled to the vehicle, and a cord channel that fluidly couples the interior of the container to an environment that is external the container, the cord channel having a first side that faces the interior of the container and a second side that faces the exterior of the container; and
a gathering cord extending through the cord channel of the container from the first side of the cord channel to the second side of the cord channel, the gathering cord being mechanically coupled to one or more portions of the vehicle cover on the first side of the cord channel, the gathering cord being humanly accessible on the second side of the cord channel in the environment that is external the container while the vehicle cover entirely or partially covers the vehicle and while the vehicle cover is housed in the container.

2. The vehicle cover system of claim 1, wherein the gathering cord is accessible on the second side of the cord channel without opening portions of the container and without removing portions of the container.

3. The vehicle cover system of claim 1, wherein the one or more coupling means include one or more hooks or clamps to couple the container to the retractable window disposed in the window frame of the vehicle.

4. The vehicle cover system of claim 1, wherein the container has two or more walls that include a first wall and a second wall, the second wall being disposed opposite the interior of the container from the first wall, one or more of the one or more coupling means being coupled to the first wall, and the cord channel being disposed in the second wall.

5. The vehicle cover system of claim 1, wherein the container has one or more walls that include a first wall, one or more of the one or more coupling means being coupled to the first wall, and the first wall including one or more portions having sufficient rigidity to at least partially maintain a shape of the container when deploying and when retracting the vehicle cover from or into the interior of the container.

6. The vehicle cover system of claim 1, further comprising a plurality of other gathering cords, each gathering cord in the plurality of other gathering cords being mechanically coupled to a different respective portion of the vehicle cover on the first side of the cord channel.

7. The vehicle cover system of claim 1, further comprising a plurality of other gathering cords, each of the other gathering cords being mechanically coupled to a different respective portion of the vehicle cover on the first side of the cord channel, the gathering cord being mechanically coupled to the other gathering cords on the first side of gathering channel.

8. The vehicle cover system of claim 1, further comprising a cord lock disposed on the gathering cord on the second side of the cord channel.

9. The vehicle cover system of claim 1, wherein the vehicle cover, the container, and the gathering cord are mechanically coupled to each other, oriented, and arranged to dispose the container between the vehicle cover and the vehicle when the vehicle cover covers the vehicle.

10. The vehicle cover system of claim 1, wherein the vehicle is configured to transport an adult human.

11. A method of using a vehicle cover system, comprising:
providing a vehicle cover system that includes a vehicle cover, a container, and a gathering cord, the container having an interior and an exterior, the container having one or more anchors, the container having an opening, the vehicle cover having a cord channel that fluidly couples the interior of the container to an environment that is external the container, the cord channel having a first side that faces the interior of the container and a second side that faces the exterior of the container, the gathering cord extending through the cord channel of the container from the first side of the cord channel to the second side of the cord channel, and the gathering cord being mechanically coupled to one or more portions of the vehicle cover on the first side of the cord channel,
wherein the vehicle cover is sized and dimensioned to entirely or partially cover a vehicle that has a body having a longitudinal length, a width measured transverse to the longitudinal length of the vehicle body, and a height measured transverse to the longitudinal length of the vehicle body and the width of the vehicle body, the vehicle cover having a longitudinal length, a width measured transverse to the longitudinal length of the vehicle cover, and a height measured transverse to the longitudinal length of the vehicle cover and the width of the vehicle cover, the longitudinal length of the vehicle cover being at least as large as the longitudinal length of the vehicle body, the width of the vehicle cover being at least as large as the width of the vehicle body, and the height of the vehicle cover being at least as large as the height of the vehicle body;
coupling the container to the vehicle via the one or more anchors, wherein the one or more anchors include one or more hooks or clamps, and coupling the container to the vehicle includes coupling the one or more hooks or clamps to a window of the vehicle;
deploying the cover from the interior of the container to entirely or partially cover the vehicle and the container with the vehicle cover while the container is anchored to the vehicle; and
pulling the gathering cord from the second side of the cord channel in the environment that is external the container while the vehicle cover entirely or partially covers the vehicle and the container and while the container is anchored to the vehicle to partially or entirely retract the vehicle cover through the opening of the container into the interior of the container.

12. The method of claim 11, wherein pulling the gathering cord comprises pulling the gathering cord with one or more human hands on the second side of the cord channel without opening portions of the container and without removing portions of the container.

13. The method of claim 11, wherein the container has two or more walls that include a first wall and a second wall, the second wall being disposed opposite the interior of the container from the first wall, one or more of the one or more anchors being coupled to the first wall, and the cord channel being disposed in the second wall.

14. The method of claim 11, wherein the container has one or more walls that include a first wall, one or more of the one or more anchors being coupled to the first wall, and the first wall including one or more portions having sufficient rigidity to at least partially maintain a shape of the container when deploying and when retracting the vehicle cover from or into the interior of the container.

15. The method of claim 11, wherein the vehicle cover system further includes a plurality of other gathering cords, each of the other gathering cords being mechanically coupled to a different respective portion of the vehicle cover on the first side of the cord channel.

16. The method of claim 11, wherein the vehicle cover system further includes a plurality of other gathering cords, each of the other gathering cords being mechanically coupled to a different respective portion of the vehicle cover on the first side of the one or more cord channels, the gathering cord being mechanically coupled to the other gathering cords on the first side of the cord channel.

17. The method of claim 11, wherein the vehicle cover system further includes a plurality of other gathering cords, each of the other gathering cords being mechanically coupled to a different respective portion of the vehicle cover on the first side of the cord channel, and pulling the gathering cord comprises pulling the other gathering cords in a predetermined order to retract different portions of the vehicle cover into the interior of the container at different times.

18. The method of claim 11, wherein the vehicle cover system further includes a cord lock disposed on the gathering cord on the second side of the cord channel, deploying the cover comprises sliding the cord lock along the gathering cord toward the end of the gathering cord that is disposed on the second side of the cord channel.

19. A vehicle cover system, comprising:
a vehicle cover, the vehicle cover being sized and dimensioned to entirely or partially cover a vehicle that is configured to transport a human;
a container having an interior and an exterior, the container being sized and dimensioned to house the vehicle cover in the interior of the container, the container having one or more coupling means for securing the container to a retractable window disposed in a window frame of the vehicle during deployment of the vehicle cover from the container, an opening to removably receive the cover into the interior of the container while the container is coupled to the vehicle, and a cord channel that fluidly couples the interior of the container to an environment that is external the container, the cord channel having a first side that faces the interior of the container and a second side that faces the exterior of the container; and
a gathering cord extending through the cord channel of the container from the first side of the cord channel to the second side of the cord channel, the gathering cord being mechanically coupled to one or more portions of the vehicle cover on the first side of the cord channel, the gathering cord being humanly accessible on the second side of the cord channel in the environment that is external the container while the vehicle cover entirely or partially covers the vehicle and while the vehicle cover is housed in the container.

* * * * *